Sept. 26, 1939.   H. FRAUENTHAL ET AL   2,174,223
UNIVERSAL JOINT
Filed Nov. 6, 1937   2 Sheets-Sheet 1
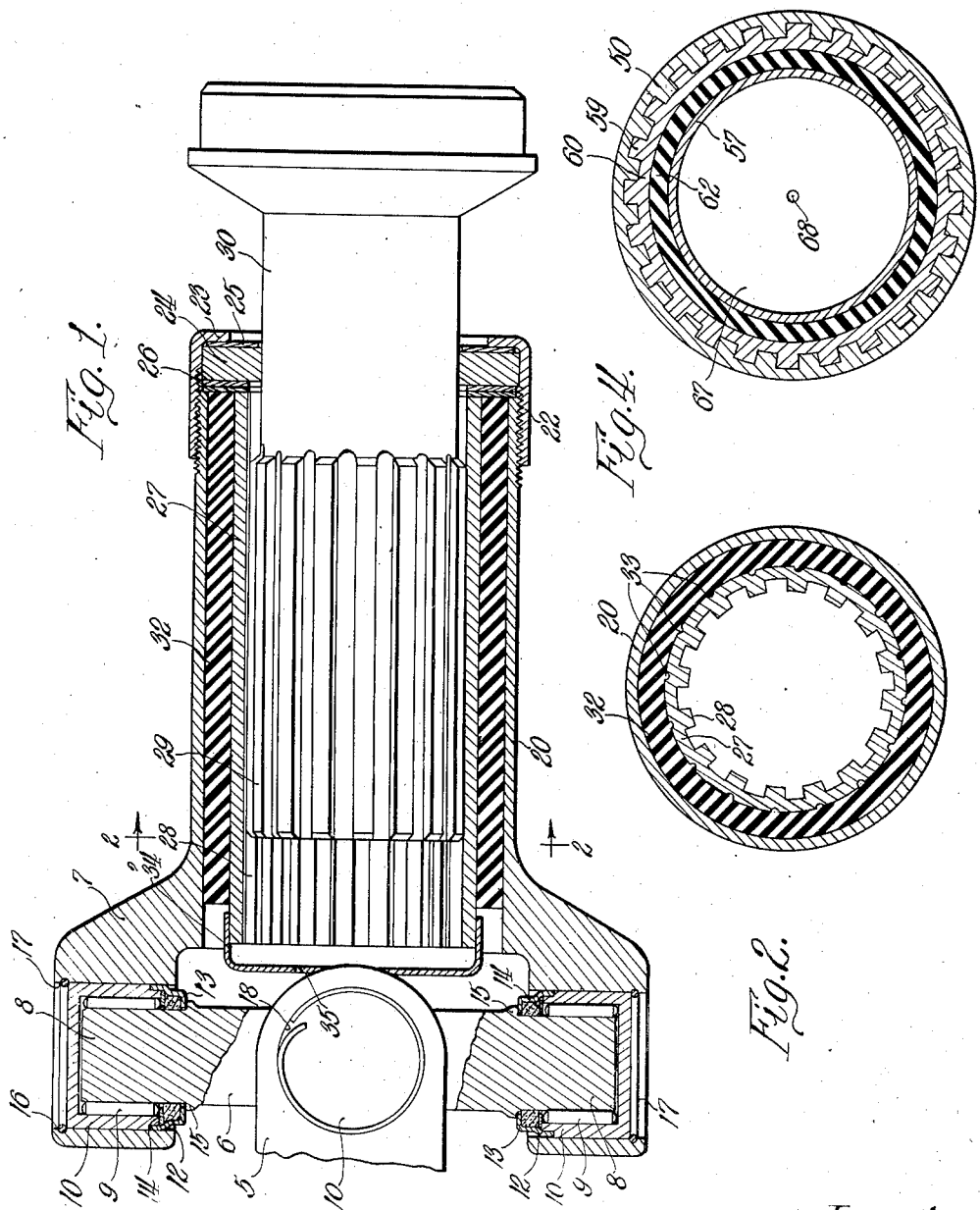
Inventors:
Harold Frauenthal
Stanley R. Thomas
By Walter E. Schirmer
Atty.

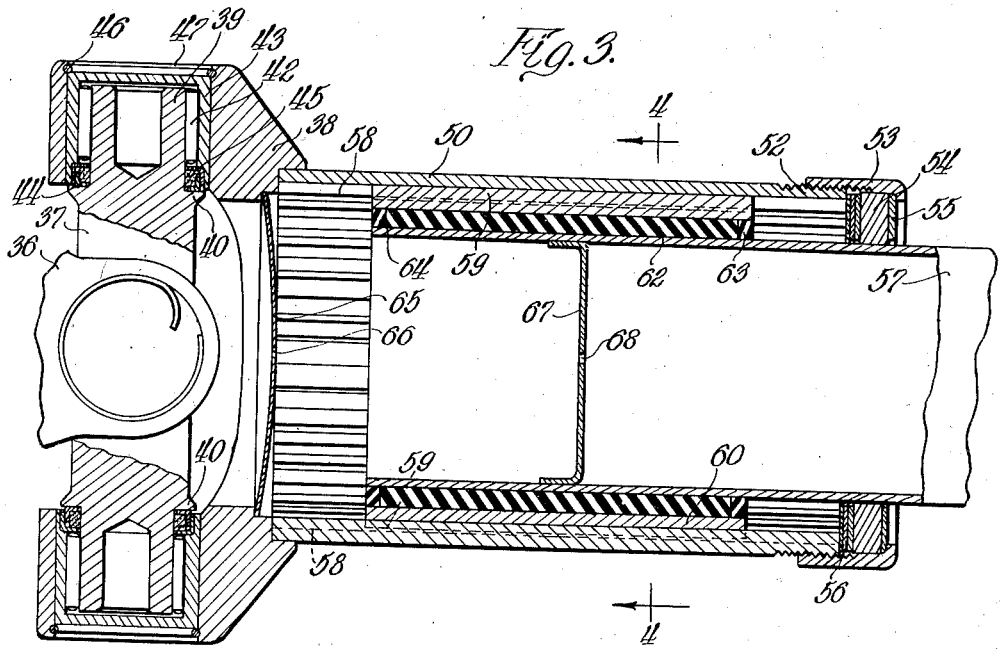

Patented Sept. 26, 1939

2,174,223

UNITED STATES PATENT OFFICE 2,174,223

UNIVERSAL JOINT

Harold Frauenthal, South Bend, Ind., and Stanley R. Thomas, Lyons, Mich., assignors to Bantam Bearings Corporation, South Bend, Ind., a corporation of Indiana Application November 6, 1937, Serial No. 173,072

9 Claims. (Cl. 64—11)

This invention relates to universal joints and more particularly is directed to a universal joint construction having incorporated therein resilient non-metallic cushioning means through which the torque is transmitted.

One of the primary objects of the present invention is to provide a universal joint containing a needle bearing assembly at each of the yoke arms, and having resilient sleeves through which torque is transmitted to the driven member from the driving member.

Another feature of the present invention is the provision of a metallic universal joint having a resilient drive whereby rattling and vibration of gears or the like in a transmission connected thereto can be effectively eliminated through the cushioning action of the resilient member.

Still another advantage of the present invention resides in the provision of a resilient drive in which the cushioning member is subjected to shearing stresses in the transmission of torque, which preserves the life of the rubber and its resiliency.

In the present invention we preferably provide needle bearing mountings of the cross member in the yoke arms, although other types of bearings may be equally well employed. By use of bearings we appreciably reduce friction in the joint. The bearing assemblies are so arranged as to be readily removable for inspection and repair. In one form of the invention we also provide rubber sleeves surrounding the outer bearing race and vulcanized within a thin external metal sleeve. This effectively prevents metal-to-metal contact through the joint and also provides the cushioning action essential to elimination of transmission noises in a vehicle propeller shaft assembly.

Another object of the present invention is to correct effectively angular velocity variations where a pair of joints are not operating through the same angle. This resilient connection also cushions the shock loads transmitted, not only through the transmission, but also to the rear axle gears.

Other objects and advantages of the present invention will be more apparent from the following detailed description which, taken in conjunction with the accompanying drawings, will disclose to those skilled in the art the particular construction and operation of a preferred form of the present invention.

In the drawings:

Figure 1 is a sectional view, with portions shown in elevation, of one form of the present invention;

Figure 2 is a sectional view taken substantially on line 2—2 of Figure 1;

Figure 3 is a view corresponding to Figure 1 showing a modified form of the invention;

Figure 4 is a sectional view taken on line 4—4 of Figure 3; and

Figure 5 is a view partly in section of a still further modification.

Referring now in detail to the drawings, and considering first the embodiment of the invention shown in Figures 1 and 2, we have provided a yoke arm 5 which is connected to a driving member, such as the driven shaft of a transmission or the like, and which has the opposite arm portions thereof rotatably mounted in a cross member 6 disposed in a plane extending normal to the driving yoke 5 and to the driven yoke 7. The cross arm 6 is provided with stud portions 8 which are adapted to receive the needle bearing assemblies comprising the needle bearing members 9 and the bearing retaining cup 10. The open end of the cup 10 is adapted to receive a cap member 12 within which is mounted a suitable lubricant seal 13 spaced from the bearings by means of the washer 14. The outer end of the cap 12 has a radially inturned flange which seats upon the annular shoulder 15 formed on the stud portion 8 of the cross member.

The bearing assembly is retained in position by means of a snap ring 16 engaging in a suitable recess formed in the arms of the yoke 7, thereby preventing outward movement of the bearing assembly within the recess or journal opening 17. The cross member 6 is of course provided with normally extending studs which are mounted in the recess 18 of the yoke arms 5 in the same manner as described in connection with the bearing mounting of the studs 8 in the yoke 7. This, therefore, provides an anti-friction mounting of the two yokes with respect to the cross member and insures transmission of the driving torque from the yoke 5 to the yoke 7 through the cross member.

The yoke 7 is provided with an axially extending sleeve portion 20 which, at its opposite end, is provided with a threaded portion receiving the end cap 22. This cap is provided with an inturned flange 23 for locking the packing washer 24 in position therein, the washer being compressed between the discs or washers 25 and 26. The washer 26 at the same time forms a closure for the end of the sleeve portion 20 of the yoke, and extends radially inwardly to close the annular groove formed between the sleeve 20 and an internal sleeve 27 which has its internal periphery splined as indicated at 28 to receive the splined end 29 of the driven shaft member 30. It will be apparent that the member 30 has longitudinal sliding movement within the sleeve 27, but is maintained in fixed non-rotative position therein by reason of the engagement of the splines 28 and 29. The sleeves 20 and 27 are coaxial in extent and form therebetween an annular recess closed at one end by the washers 26. In the assembly of the construction thus far described the sleeve member 27 is first positioned within the yoke 7 with the packing 24 and end cap 22 in position, but without the yoke being assembled to the cross member 6. The member 7 is then set up on end, and rubber or other resilient cushioning material is poured into the annular recess and substantially fills the same to form the rubber cushioning sleeve 32. This sleeve is molded in place and vulcanized to the internal surface of the sleeve 20 and the external surface of the sleeve 27 thereby rigidly securing the same to the surfaces whereby torque can be transmitted upon rotation of the sleeve 20 to the sleeve 27, and consequently to the driven member 30. If desired, in order to secure greater keying action, we may provide suitable notches or recesses 33 in the outer periphery of the sleeve 27 into which the rubber may flow for keying engagement, or similar grooves in the inner periphery of sleeve 20, but we find that the vulcanizing of the sleeve 32 to the surfaces mentioned above results in a sufficient bond so that it is not essential to provide the keying engagement shown in Figure 2. Of course, we may force the rubber between the sleeves under compression, with grooves or keyways for preventing slip, in place of vulcanizing the rubber into position.

With this construction it will be apparent that any rattling or vibration of the gears connected to the yoke 5 will be cushioned by the sleeve 32 which forms a non-metallic connection between the yoke 7 and the driven member 30. This insures elimination of transmission noises, and provides a resilient cushioned drive through the universal connection while yet insuring positive transmission of driving torque. It also eliminates tire and axles noises finding their way into the forward mechanism. In front wheel drive automobiles and tractors a substantial cushioning action is provided between the source of power and the wheel.

Preferably, the splined surfaces 28 and 29 are lubricated in any suitable manner and escape of lubricant from these surfaces is prevented by the packing 24 and by a closure cap 34 which embraces the inner end of the sleeve 27 and may be secured thereto in any desired manner, and which is provided with breather opening 35 to prevent possible vacuum effects within the interior of sleeve 27 upon outward movement of the element 30 with respect to the sleeve, and to prevent lubricant pumping.

In the embodiment shown in Figures 3 and 4 a slightly different modification of the construction shown in Figures 1 and 2 is provided.

Yoke 36 is connected to a cross arm 37 by means of anti-friction needle bearings substantially in the same manner as described in Figures 1 and 2, but is shown more in detail in the sectional view of the connection between the cross member 37 and the yoke 38 in Figure 3. It will be noted that the cross member 37 is provided with stud portions 39 of reduced diameter having the radially extending shoulder portions 40 which form seats for limiting the inward movement of the bearing assemblies comprising the roller bearing members 42 and the inverted bearing cup 43. Suitable sealing means 45 is provided between the end of the bearing cup 43 and the shoulders 40, and is compressed in position against a thrust washer 44 abutting against the shoulder 40. The bearing cap or retaining member 43 is held in fixed position in the arm of the yoke 38 by means of the snap ring 46 engaging in the groove in the recess 47 to prevent outward movement of the bearing assembly. Inward movement of this assembly is limited by the shoulder 40.

Rigidly secured to the hub portion of the yoke 38 is an axially extending sleeve member 50 having a threaded portion 52 at its outer end adapted to receive the closure cap 53 which has an inturned end flange for retaining the packing 54 in position. Suitable washers 55 and 56 at opposite sides of the packing serve to axially compress the same into sealing engagement with the external periphery of the tubular member 57 which forms the driven element of the assembly. The internal surface of the sleeve 50 is provided with splines 58 which are adapted to engage suitable external splines 59 formed on a sleeve member 60 which has relative axial sliding movement within the sleeve 50. Vulcanized between the internal surface of the sleeve 60 and the external surface of the member 57 is a resilient sleeve 62 formed of rubber or the like, which has sealing washers 63 and 64 at opposite ends thereof for preventing lubricant which is provided for the splined surfaces 58 and 59 from coming into contact with the resilient sleeve 62 and possibly affecting the life thereof. A suitable concave disc member 65 is snapped into the central portion of the yoke 38 to form a lubricant closure therefor, and is provided with the breather opening 66 for the same purpose as the opening 35 in the closure member 34 of Figure 1. A second lubricant closure member 67 is secured within the interior of the driven member 57 and is also provided with a breather opening 68 to prevent variations of pressure caused by relative movement of the member 57 with respect to the sleeve 50. The packing 54 prevents any loss of lubricant externally of the member 57 and thus provides a leak-proof joint.

This construction therefore also provides for a resilient cushioned drive through the universal joint assembly, and also eliminates any transmission of noise from the transmission to the other parts of the drive transmitting mechanism by reason of the non-metallic joint between the sleeve 60 and the driven element 57. The rubber sleeve or cushioning element being vulcanized to the two surfaces to which torque is to be transmitted is placed in shear stress only, and consequently its life is retained for a long period of time by reason of its being subjected only to such shearing stresses. It will be noted that in both of the embodiments of Figures 1 and 3 any possible longitudinal stress placed on the sleeve members due to relative movement of the driven element with respect to the joint will also produce a shearing stress in the rubber sleeve so that at no time is the rubber under any tensile or compressive stresses.

Considering the embodiment of the invention disclosed in Figure 5, a cross member 70 is provided which is somewhat similar to the cross member 37 of Figure 3, having the reduced stud portions 72 provided with the radial extending shoulder portion 73. The two yokes 74 and 75 are coupled to the studs of the cross member in the same manner, and consequently a description of the mounting of the yoke 75 on the stud 72 is believed sufficient.

In this embodiment of the invention a needle bearing assembly comprising the needle rollers 76 and the retaining cup 77 are inserted over the stud 72 and are prevented from radial inward movement toward the center of the member 70 by means of the sealing means 78 bearing against the washer 79 seated on the radial shoulders 73. Vulcanized to the outer surface of the bearing cup or retainer 77 is a rubber sleeve or cylinder 80 which has its outer peripheral surface vulcanized to the internal surface of a thin metal sleeve 82 of a diameter such that it has sliding movement within the journal openings of the yoke arms 83 and 84. Each of these arms is provided with a tapped opening 85 adapted to receive the studs 86 for clamping a retaining clip 87 to the outer portions of the arms, the clip 87 having a portion engaging the boss 88 on the retainer 77 to limit outward movement of the retainer, and having an inturned lip portion 89 engaging a suitable boss 90 on the arms for preventing rotation of the clip 87 about the stud 86. The stud portions 72 of the cross member are provided with axial recesses 92 which communicated with the ducts 93 extending through the radial arms of the cross member. Thus, lubricant admitted to the center of the cross member may flow through the ducts 93 and recesses 92 into the bearing assemblies, and is prevented from leakage therefrom by the sealing means 78 compressed against the surface of the stud 72 by the bearing retaining cup 77. It will be noted that relative angular movement of the yokes 74 and 75 is accommodated by the needle bearings 76, but that no metal-to-metal contact between the two yoke members or between either yoke member and the cross member is possible due to the insulating and cushioning effect of the sleeves 80. These sleeves are in compressive stress, both longitudinally and circumferentially during operation of the joint, and provide an effective cushioning and resilient drive connection between the driving and driven elements of the joint.

It will therefore be apparent that in all embodiments of the invention we have provided a construction in which there is no possible metallic contact through the joint, while at the same time, a resilient cushioning effect is produced which prevents transmission of vibrations or noises through the joints and also serves to cushion the driving elements connected to the driving member of the joint, such as gears in a transmission or the like from vibration and rattling.

We are aware that various changes in details of construction may be made without departing from the underlying principles exemplified in the illustrated embodiments of the invention, and we therefore do not intend to be limited except as defined by the scope and spirit of the appended claims.

We claim:

1. A universal connection between a coupling yoke and a shaft, comprising a sleeve portion extending outwardly from said yoke, an internally splined sleeve therein having grooves in the external surface thereof, a shaft having a splined end non-rotatably engaged in said sleeve, resilient cushioning means bonded between said sleeve portion and said sleeve and keyed in said grooves, and means carried by the outer end of said yoke sleeve portion limiting outward axial movement of said sleeve and including means sealing about the lateral surface of said shaft.

2. The combination, with one yoke of a universal joint, of a sleeve portion extending outwardly from said yoke and having internal splines, a shaft extending into said sleeve portion, an annular sleeve of rubber vulcanized to the lateral surface of said shaft, a second sleeve having external splines engaging said internal splines and embracing said rubber sleeve, said rubber sleeve being vulcanized thereto, and sealing means carried at the outer end of said sleeve portion engaging about the lateral surface of said shaft.

3. The combination, with one yoke of a universal joint, of a sleeve extending therefrom, an internal sleeve spaced within said yoke sleeve, an annular sleeve of rubber bonded between said sleeves and forming a resilient torque transmitting connection therebetween, internal splines on said internal sleeve, a splined shaft extending thereinto, sealing means at the end of said yoke sleeve embracing the external surface of said shaft and serving as an abutment limiting outward axial movement of said internal sleeve, and a closure cap secured over the inner end of said internal sleeve whereby lubricant may be retained between the spline surfaces.

4. The combination, with a universal joint yoke having a sleeve extending therefrom provided with internal splines, of a shaft, an intermediate externally splined sleeve of a diameter larger than the shaft diameter, rubber vulcanized between said shaft and said intermediate sleeve forming a resilient torque transmitting connection therebetween, and means at opposite ends of said rubber sleeve sealing the same against contact with lubricant.

5. The combination, with a yoke having an extending cylindrical sleeve provided with internal splines, of a shaft, an intermediate sleeve radially spaced from said shaft, resilient torque transmitting means between said shaft and said intermediate sleeve, external splines on said intermediate sleeve engaging the splines on said yoke sleeve, and means secured to opposite ends of said yoke sleeve for preventing escape of lubricant therein.

6. The combination, with a yoke member having an extending cylindrical sleeve, of a shaft member extending thereinto and radially spaced therefrom, an intermediate sleeve member between said other two members, a rubber sleeve vulcanized between said intermediate sleeve member and one of said other members, splined driving connection between said intermediate sleeve member and the other of said members, and sealing means at opposite ends of said rubber sleeve preventing lubricant from contacting therewith.

7. In combination, a hollow tubular driving member, a co-axial hollow tubular driven member of different diameter, an intermediate coaxial sleeve member, splined driving connection between said sleeve member and one of said tubular members, a rubber sleeve bonded between the other tubular member and said sleeve member, sealing means between said tubular members independently of said sleeve member, and sealing means enclosing the end surfaces of said rubber sleeve.

8. In combination, a hollow tubular driving member, a coaxial hollow tubular driven member of different diameter, an intermediate coaxial sleeve member, splined driving connection between said sleeve member and one of said tubular members, a rubber sleeve bonded between the other tubular member and said sleeve member, sealing means between said tubular members independently of said sleeve member, and sealing means at opposite ends of said intermediate sleeve member protecting said rubber sleeve against contact with lubricant.

9. In combination, a cylindrical outer sleeve, a fitting at one end thereof having a counterbore radially inwardly of the sleeve, a sealing plate closing said bore, said sleeve being internally splined, an intermediate sleeve having external splines engaging in said cylindrical sleeve and axially shiftable therein, an inner sleeve radially spaced from said intermediate sleeve, a rubber sleeve bonded between said intermediate sleeve and said inner sleeve, and sealing means on said outer sleeve engaging the lateral surface of said inner sleeve and forming an abutment limiting sliding movement of said intermediate sleeve.

HAROLD FRAUENTHAL.
STANLEY R. THOMAS.